(12) United States Patent
Nago (10) Patent No.: US 11,267,528 B2
(45) Date of Patent: Mar. 8, 2022

(54) BICYCLE DEVICE AND BRAKE SYSTEM

(71) Applicant: Shimano Inc., Osaka (JP)

(72) Inventor: Daisuke Nago, Osaka (JP)

(73) Assignee: Shimano Inc., Osaka (JP)

( * ) Notice: Subject to any disclaimer, the term of this patent is extended or adjusted under 35 U.S.C. 154(b) by 74 days.

(21) Appl. No.: 16/156,380

(22) Filed: Oct. 10, 2018

(65) Prior Publication Data

US 2019/0118901 A1 Apr. 25, 2019

(30) Foreign Application Priority Data

Oct. 20, 2017 (JP) .............................. JP2017-203756
May 2, 2018 (JP) .............................. JP2018-088810

(51) Int. Cl.
| | |
|---|---|
| *B62L 1/00* | (2006.01) |
| *B62L 3/02* | (2006.01) |
| *B60T 13/58* | (2006.01) |
| *B62L 3/00* | (2006.01) |
| *F16D 65/18* | (2006.01) |
| *F16D 125/48* | (2012.01) |
| *F16D 121/04* | (2012.01) |

(Continued)

(52) U.S. Cl.
CPC ................ *B62L 3/02* (2013.01); *B60T 13/58* (2013.01); *B60T 13/588* (2013.01); *B62L 1/00* (2013.01); *B62L 1/005* (2013.01); *B62L 3/00* (2013.01); *B62L 3/023* (2013.01); *F16D 65/18* (2013.01); *F16D 65/183* (2013.01); *F16D 2121/04* (2013.01); *F16D 2121/24* (2013.01); *F16D 2125/023* (2013.01); *F16D 2125/22* (2013.01); *F16D 2125/48* (2013.01)

(58) Field of Classification Search
CPC .. B60T 13/745; F16D 55/228; F16D 2121/04; F16D 2121/24; F16D 2125/40; F16D 2125/48; B62L 1/00; B62L 3/023
See application file for complete search history.

(56) References Cited

U.S. PATENT DOCUMENTS

| | | | | |
|---|---|---|---|---|
| 5,150,772 A | * | 9/1992 | Pantale | ..................... B60T 8/26 188/72.4 |
| 5,348,123 A | * | 9/1994 | Takahashi | ................. B60T 7/04 188/72.1 |

(Continued)

FOREIGN PATENT DOCUMENTS

| | | |
|---|---|---|
| CN | 205769925 U | 12/2016 |
| CN | 106740792 A | 5/2017 |

(Continued)

OTHER PUBLICATIONS

Machine translation of DE 102012222058, retrieved Mar. 12, 2021 (Year: 2021).*

*Primary Examiner* — Bradley T King
(74) *Attorney, Agent, or Firm* — Global IP Counselors, LLP (57) ABSTRACT

A brake device is configured to apply a braking force to a rotary body of a human-powered vehicle. The brake device includes a power transfer medium operated braking portion, a first actuator and a second actuator. The first actuator is operatively coupled to the power transfer medium operated braking portion by a power transfer medium. The second actuator is operatively coupled to the first actuator and operated by electric power in accordance with an input to an operating device.

20 Claims, 5 Drawing Sheets

(51) Int. Cl.
  *F16D 121/24* (2012.01)
  *F16D 125/02* (2012.01)
  *F16D 125/22* (2012.01)

(56) References Cited

U.S. PATENT DOCUMENTS

| | | | | |
|---|---|---|---|---|
| 5,386,890 | A * | 2/1995 | Itsuaki | F16D 65/097 188/72.4 |
| 5,390,771 | A * | 2/1995 | Hinkens | B62L 1/00 188/24.12 |
| 6,158,542 | A * | 12/2000 | Nolet | B62L 3/00 180/206.2 |
| 6,170,617 | B1 * | 1/2001 | Nakamura | B60T 5/00 188/264 D |
| 6,347,689 | B1 * | 2/2002 | Ohishi | B60T 1/065 188/72.4 |
| 9,758,141 | B2 * | 9/2017 | Kim | B60T 13/08 |
| 2002/0020591 | A1 * | 2/2002 | Schanzenbach | B60T 13/745 188/158 |
| 2002/0166736 | A1 * | 11/2002 | Yunba | F16D 55/228 188/72.5 |
| 2003/0083797 | A1 * | 5/2003 | Yokoyama | B60T 13/741 701/70 |
| 2008/0111342 | A1 | 5/2008 | Niekerk et al. | |
| 2012/0053804 | A1 | 3/2012 | Saida et al. | |
| 2013/0264154 | A1 * | 10/2013 | Cho | F16D 65/18 188/72.4 |
| 2015/0114769 | A1 * | 4/2015 | Kim | F16D 65/18 188/72.4 |
| 2016/0061279 | A1 * | 3/2016 | Kariyama | B60T 13/745 701/70 |
| 2016/0375347 | A1 | 12/2016 | Stubberud | |
| 2017/0028973 | A1 * | 2/2017 | Arienti | B62L 3/08 |
| 2017/0045105 | A1 * | 2/2017 | Hofmeister | F16D 55/225 |
| 2017/0190335 | A1 * | 7/2017 | Gillett | A63C 17/12 |
| 2018/0105153 | A1 | 4/2018 | Adachi et al. | |
| 2018/0257620 | A1 * | 9/2018 | Crossman | B60T 13/20 |
| 2019/0250619 | A1 * | 8/2019 | Gillett | H04W 76/14 |
| 2019/0359282 | A1 * | 11/2019 | Nakashima | B62J 99/00 |
| 2020/0269949 | A1 * | 8/2020 | Ikeda | B62K 19/38 |

FOREIGN PATENT DOCUMENTS

| | | | |
|---|---|---|---|
| DE | 102012222058 A1 * | 6/2014 | ............ B62L 3/023 |
| JP | 5-60157 A | 3/1993 | |
| JP | 5-112233 A | 5/1993 | |
| JP | 2012-50304 A | 3/2012 | |
| JP | 2016-203923 A | 12/2016 | |
| JP | 2017-30395 A | 2/2017 | |
| JP | 2017-109699 A | 6/2017 | |
| JP | 2017-178312 A | 10/2017 | |

* cited by examiner

BICYCLE DEVICE AND BRAKE SYSTEM

CROSS-REFERENCE TO RELATED APPLICATIONS

This application claims priority to Japanese Patent Application No. 2017-203756, filed on Oct. 20, 2017, and Japanese Patent Application No. 2018-088810, filed on May 2, 2018. The entire disclosures of Japanese Patent Application Nos. 2017-203756 and 2018-088810 are hereby incorporated herein by reference.

BACKGROUND

Field of the Invention

The present invention generally relates to a brake device and a brake system including a brake device.

Background Information

A brake device that is installed in a human-powered vehicle and driven by electric power is known. For example, a brake device is disclosed in Japanese Laid-Open Patent Publication No. 2017-30395 (patent document 1) that includes a braking portion that brakes to a rotary body of a human-powered vehicle and an actuator that drives the braking portion.

SUMMARY

It is preferred that a rotary body of a human-powered vehicle is appropriately braked. One object of the present disclosure to provide a brake device and a brake system that appropriately brake a rotary body of a human-powered vehicle.

A brake device according to a first aspect of the present disclosure is provided for applying a braking force to a rotary body of a human-powered vehicle. The brake device includes a power transfer medium operated braking portion, a first actuator and a second actuator. The first actuator is operatively coupled to the power transfer medium operated braking portion by a power transfer medium. The second actuator is operatively coupled to the first actuator and operated by electric power in accordance with an input to an operating device. With the brake device according to the first aspect, the second actuator is driven by electric power in accordance with an input to the operating device, the second actuator drives the first actuator, and the first actuator drives the power transfer medium operated braking portion by the power transfer medium. Thus, it is possible to appropriately brake the rotary body of the human-powered vehicle.

In accordance with a second aspect of the present disclosure, the brake device according to the first aspect is configured so that the second actuator is operated by electric power generated in the electric power generator in accordance with traveling of the human-powered vehicle. With the brake device according to the second aspect, the need for the supply and storage of electric power by an external power supply is eliminated, and it is possible to appropriately brake the rotary body of the human-powered vehicle using electric power generated in the electric power generator.

In accordance with a third aspect of the present disclosure, the brake device according to the first or second aspect is configured so that the second actuator includes an electric motor. With the brake device according to the third aspect, it is possible to appropriately brake the rotary body of the human-powered vehicle.

In accordance with a fourth aspect of the present disclosure, the brake device according to any one of the first to third aspects is configured so that the first actuator includes a pump using a fluid as the power transfer medium. With the brake device according to the fourth aspect, it is possible to appropriately brake the rotary body of the human-powered vehicle.

In accordance with a fifth aspect of the present disclosure, the brake device according to any one of the first to fourth aspects is configured so that the power transfer medium operated braking portion includes a caliper configured to clamp the rotary body. With the brake device according to the fifth aspect, it is possible to appropriately brake the rotary body of the human-powered vehicle.

In accordance with a sixth aspect of the present disclosure, the brake device according to the first or second aspect is configured so that the second actuator includes an electric motor, the first actuator includes a pump using a fluid as the power transfer medium, and the pump includes a master piston configured to be driven by the electric motor. With the brake device according to the sixth aspect, it is possible to appropriately brake the rotary body of the human-powered vehicle using a fluid.

In accordance with a seventh aspect of the present disclosure, the brake device according to the sixth aspect is configured so that the power transfer medium operated braking portion includes a caliper configured to clamp the rotary body. The caliper includes a caliper body, a plurality of slave pistons provided at the caliper body, and a flow passage provided at the caliper body to apply hydraulic pressure to the slave pistons in accordance with movement of the master piston. With the brake device according to the seventh aspect, the slave pistons and the flow passage are provided at the caliper body. Thus, the configuration of the brake device is simplified.

In accordance with an eighth aspect of the present disclosure, the brake device according to the seventh aspect is configured so that the pump and the electric motor are provided at the caliper body. With the brake device according to the eighth aspect, the configuration of the brake device is simplified.

In accordance with a ninth aspect of the present disclosure, the brake device according to the eighth aspect further includes a first transmission operatively coupled between the electric motor and the master piston to transmit rotation of the electric motor to the master piston. The first transmission is provided at the caliper body. With the brake device according to the ninth aspect, rotation of the electric motor is changed in speed and is transmitted to the master piston.

In accordance with a tenth aspect of the present disclosure, the brake device according to the ninth aspect is configured so that the first transmission is a speed reduction mechanism. With the brake device according to the tenth aspect, rotation of the electric motor is reduced in speed and is transmitted to the master piston.

In accordance with an eleventh aspect of the present disclosure, the brake device according to any one of the seventh to tenth aspects further includes a reservoir tank provided at the caliper body and fluidly connected to the pump. With the brake device according to the eleventh aspect, the hydraulic pressure is further appropriately applied to the slave pistons.

In accordance with a twelfth aspect of the present disclosure, the brake device according to any one of the seventh to eleventh aspects further includes a second transmission operatively coupled between the electric motor and the slave pistons to change a moving speed of the slave pistons. With the brake device according to the twelfth aspect, the moving speed of the slave pistons is appropriately changed.

In accordance with a thirteenth aspect of the present disclosure, the brake device according to the twelfth aspect is configured so that the second transmission is operatively coupled between the electric motor and the master piston to change the moving speed of the slave pistons by changing a moving speed of the master piston. With the brake device according to the thirteenth aspect, the moving speed of the slave pistons is easily changed.

In accordance with a fourteenth aspect of the present disclosure, the brake device according to the twelfth aspect is configured so that the second transmission is operatively coupled between the electric motor and the master piston to change the moving speed of the slave pistons by changing a fluid feeding amount of the fluid per unit time towards the slave pistons. With the brake device according to the fourteenth aspect, moving speed of the slave pistons is easily changed.

A brake system according to a fifteenth aspect of the present disclosure includes the brake device according to any one of the first to fourteenth aspects and an electric power generator that generates electricity in accordance with traveling of the human-powered vehicle. With the brake system according to the fifteenth aspect, the need for the supply and storage of electric power by an external power supply is eliminated, and it is possible to appropriately brake the rotary body of the human-powered vehicle using electric power generated in the electric power generator.

In accordance with a sixteenth aspect of the present disclosure, the brake system according to the fifteenth aspect is configured so that the electric power generator includes at least one of a hub dynamo, a block dynamo, an assist regeneration mechanism, and a vibration electricity generating element. With the brake system according to the sixteenth aspect, various electric power generators can be used in the brake system.

In accordance with a seventeenth aspect of the present disclosure, the brake system according to the fifteenth or sixteenth aspect further includes a power storage device electrically connected the electric power generator. With the brake system according to the seventeenth aspect, even in a situation where electric power from the electric power generator is insufficient, it is possible to appropriately brake the rotary body of the human-powered vehicle using electric power stored in the power storage device.

In accordance with an eighteenth aspect of the present disclosure, the brake system according to the seventeenth aspect is configured so that the power storage device includes a rechargeable battery. With the brake system according to the eighteenth aspect, the configuration of the power storage device is simplified.

In accordance with a nineteenth aspect of the present disclosure, the brake system according to the seventeenth or eighteenth aspect is configured so that the power storage device is further configured to be recharged by an external power supply other than the electric power generator. With the brake system according to the nineteenth aspect, sufficient electric power can be stored in the power storage device.

In accordance with a twentieth aspect of the present disclosure, the brake system according to any one of the seventeenth to nineteenth aspects is configured so that the second actuator is operated by electric power from the power storage device. With the brake system according to the twentieth aspect, it is possible to appropriately brake the rotary body of the human-powered vehicle using electric power stored in the power storage device.

In accordance with a twenty-first aspect of the present disclosure, the brake system according to any one of the fifteenth to twentieth aspects further includes the operating device. With the brake system according to the twenty-first aspect, it is possible to appropriately brake the rotary body of the human-powered vehicle in accordance with an input to the operating device.

In accordance with a twenty-second aspect of the present disclosure, the brake system according to any one of the fifteenth to twenty-first aspects further includes an electronic controller operatively coupled to the second actuator. With the brake system according to the twenty-second aspect, it is possible to appropriately brake the rotary body of the human-powered vehicle in accordance with an input to the operating device.

A brake system according to a twenty-third aspect of the present disclosure includes the brake device according to any one of the seventh to fourteenth aspects and an actuator control device provided at the caliper body to control the first actuator. With the brake system according to the twenty-third aspect, the configuration of the brake device is simplified.

In accordance with a twenty-fourth aspect of the present disclosure, the brake system according to the twenty-third aspect is configured so that the actuator control device includes a wireless communication device that is configured to perform wireless communication with an external device. With the brake system according to the twenty-fourth aspect, the convenience is increased.

In accordance with a twenty-fifth aspect of the present disclosure, the brake system according to the twenty-fourth aspect is configured so that the external device includes the operating device. With the brake system according to the twenty-fifth aspect, communication is appropriately performed with the operating device.

The brake device and the brake system according to the present disclosure appropriately brake the rotary body of the human-powered vehicle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Embodiments

Figure 1:
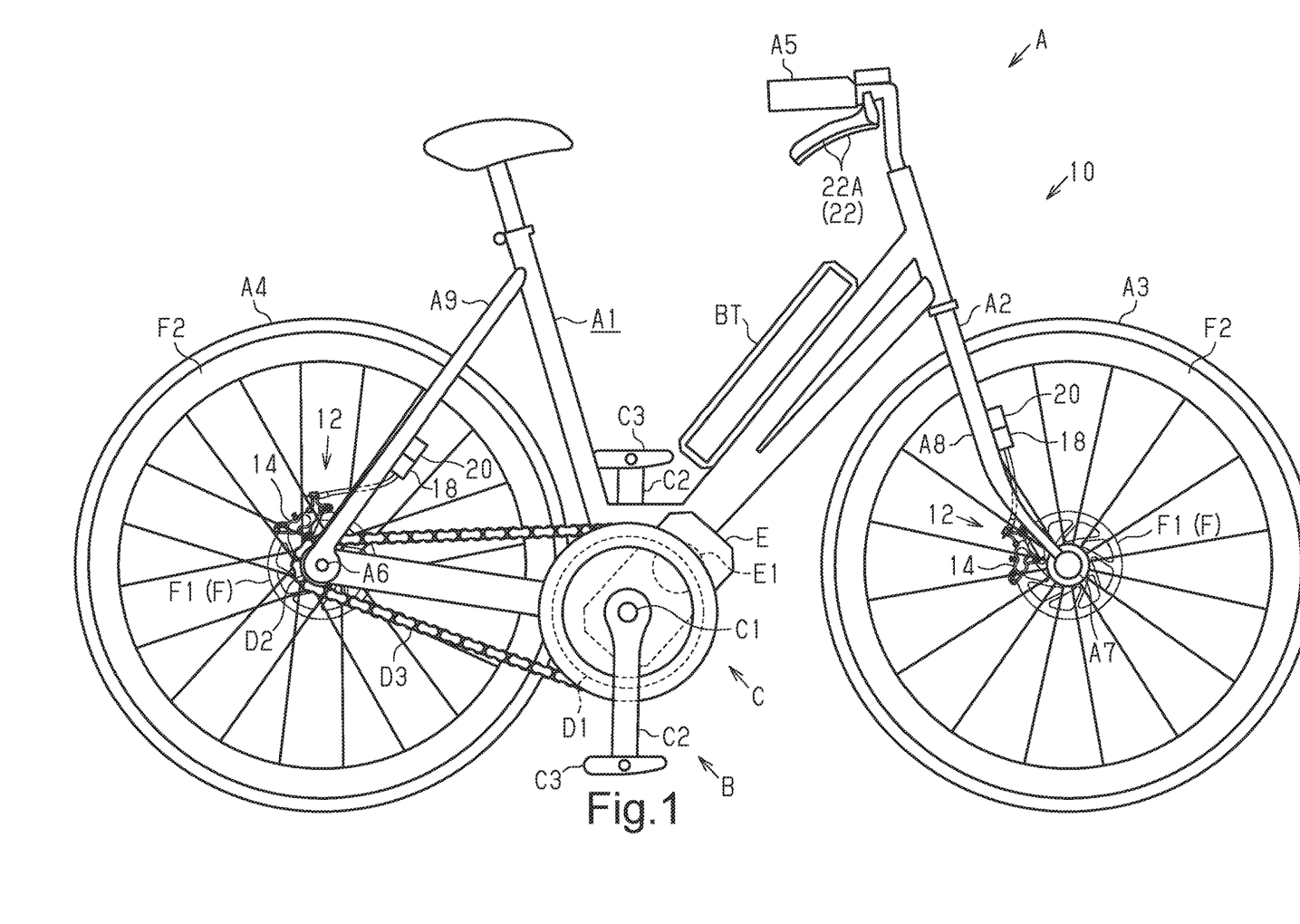
FIG. 1 is a side view of a human-powered vehicle in which a first embodiment of a brake system is installed

A human-powered vehicle A that includes a brake system 10 will now be described with reference to FIG. 1. The human-powered vehicle A includes the brake system 10. Here, the human-powered vehicle means a vehicle that at least partially uses human power as driving power for traveling and includes a vehicle that electrically assists the human power. A vehicle that uses only driving power other than human power is not included in the human-powered vehicle. In particular, a vehicle that uses only an internal combustion engine as driving power is not included in the human-powered vehicle. The human-powered vehicle is generally assumed to be a compact light vehicle or a vehicle that does not require a license for driving on a public road. The illustrated human-powered vehicle A is a bicycle (e-bike) that is electrically driven in an auxiliary manner. More specifically, the illustrated human-powered vehicle A is a city bike. The human-powered vehicle A further includes a frame A1, a front fork A2, a front wheel A3, a rear wheel A4, a handlebar A5, and a drivetrain B.

The drivetrain B includes a crank assembly C, a front sprocket D1, a rear sprocket D2, and a chain D3. The crank assembly C includes a crankshaft C1, a pair of crank arms C2, and a pair of pedals C3. The pair of pedals C3 is rotatably coupled to distal ends of the crank arms C2.

The front sprocket D1 is provided at the crank assembly C to rotate integrally with the crankshaft C1. The rear sprocket D2 is provided at a hub A6 of the rear wheel A4. The chain D3 runs around the front sprocket D1 and the rear sprocket D2. Driving force applied to the pedals C3 by the rider of the human-powered vehicle A is transmitted via the front sprocket D1, the chain D3, and the rear sprocket D2 to the rear wheel A4.

The human-powered vehicle A further includes an electric assist unit E. The electric assist unit E operates to assist propulsion force of the human-powered vehicle A. The electric assist unit E operates in accordance with, for example, the driving force applied to the pedals C3. The electric assist unit E includes an electric motor E1. The electric assist unit E is driven by electric power supplied from a battery BT installed in the human-powered vehicle A.

The brake system 10 includes a pair of brake devices 12. In the present embodiment, the brake devices 12 are disc brake devices that brake rotary bodies F of the human-powered vehicle A. The rotary bodies F are disc brake rotors F1 provided to each of the front wheel A3 and the rear wheel A4 of the human-powered vehicle A. One of the brake devices 12 is provided corresponding to, for example, the front wheel A3. The other brake device 12 is provided corresponding to, for example, the rear wheel A4. The brake devices 12 have the same structure. The brake devices 12 can be rim brake devices. In this case, the rotary bodies F are rims F2.

Each of the brake devices 12 includes a power transfer medium operated braking portion 14, a first actuator 18 and a second actuator 20. The power transfer medium operated braking portion 14 will hereinafter be simply referred to as the braking portion 14. The braking portion 14 is configured to apply a braking force to a corresponding one of the rotary bodies F of the human-powered vehicle A. The first actuator 18 is operatively coupled to the braking portion 14 by a power transfer medium 16. Thus, the first actuator 18 selectively drives the braking portion 14 by the power transfer medium 16. The second actuator 20 is operatively coupled to the first actuator 18 and operated by electric power in accordance with an input to an operating device 22.

Thus, the second actuator 20 selectively drives the first actuator 18. The braking portion 14 each include a caliper clamping the rotary body F. The first actuator 18 and the second actuator 20 are provided at, for example, one of the frame A1, the front fork A2, and the braking portions 14. In the present embodiment, in the brake device 12 corresponding to the front wheel A3, the first actuator 18 and the second actuator 20 are provided at a blade A8 (blade located behind plane of FIG. 1) of the front fork A2. In the brake device 12 corresponding to the rear wheel A4, the first actuator 18 and the second actuator 20 are provided at a seatstay A9 (the seatstay located behind plane of FIG. 1) of the frame A1.

Figure 2:
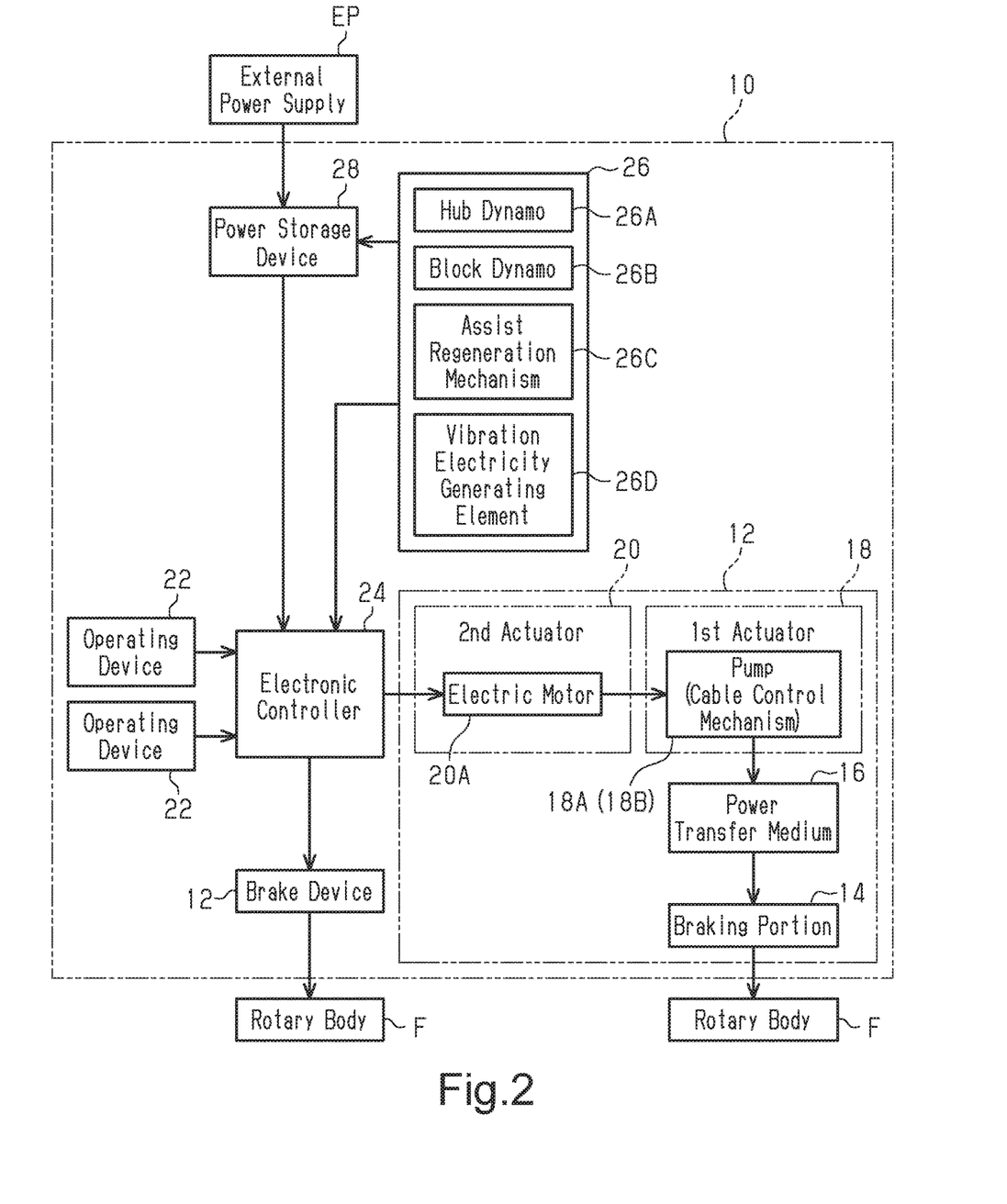
FIG. 2 is a block diagram of the brake system shown in FIG. 1.

The brake system 10 further includes a pair of operating devices 22 and an electronic controller 24 (refer to FIG. 2). The operating devices 22 are provided at the left side of the handlebar A5 and the right side of the handlebar A5 with respect to a center plane of the human-powered vehicle A. The operating devices 22 each includes a lever 22A. The electronic controller 24 controls the brake devices 12 in accordance with inputs to the operating devices 22. The electronic controller 24 is a central processing unit (CPU) or a micro processing unit (MPU) that includes one or more processors. The term "electronic controller" as used herein refers to hardware that executes a software program. In the present embodiment, the electronic controller 24 controls one of the brake devices 12 in accordance with an operation of the lever 22A of one of the operating devices 22 and controls the other brake device 12 in accordance with an operation of the lever 22A of the other operating device 22. The electronic controller 24 can be separately provided for each of the operating devices 22 to control each of the brake devices 12. Alternatively, the brake devices 12 can be operated in accordance with an operation of each of the pair of operating devices 22. In this case, the ratio of braking forces applied to the brake devices 12 by an operation of one of the operating devices 22 can differ from the ratio of braking forces applied to the brake devices 12 by an operation of the other operating device 22.

As shown in FIG. 2, the brake system 10 further includes an electric power generator 26 that generates electricity in accordance with traveling of the human-powered vehicle A and a power storage device 28 that stores electric power from the electric power generator 26. The electric power generator 26 is configured to supply electric power to various electric components that are included in the brake system 10 and the power storage device 28. The various electric components included in the brake system 10 include, for example, the second actuators 20 and the controller 24. The power storage device 28 includes a rechargeable battery. The power storage device 28 is configured to supply electric power to the various electric components included in the brake system 10. The power storage device 28 is also configured to be recharged by an external power supply EP other than the electric power generator 26.

The electric power generator 26 includes at least one of a hub dynamo 26A, a block dynamo 26B, an assist regeneration mechanism 26C and a vibration electricity generating element 26D. The hub dynamo 26A is provided on at least one of the hubs A7 (refer to FIG. 1) of the front wheel A3 and a hub A6 of the rear wheel A4. The block dynamo 26B is provided on at least one of the frame A1 and the front fork A2 to be contactable with at least one of the front wheel A3, the rim F2 of the front wheel A3, the rear wheel A4, and the rim F2 of the rear wheel A4. The assist regeneration mechanism 26C includes, for example, the electric motor E1 of the electric assist unit E. The vibration electricity generating element 26D is provided at a portion that is susceptible to vibration of the front wheel A3 and the rear wheel A4 received from the ground (not shown). The vibration electricity generating element 26D is provided on at least one of the frame A1 and the front fork A2.

The second actuators 20 drive the first actuators 18 with electric power in accordance with inputs to the operating devices 22. In other words, the second actuators 20 are operatively coupled to one of the first actuators 18, respectively, and operated by electric power in accordance with an input to one of the operating devices 22. The second actuators 20 are operated by electric power that is generated in the electric power generator 26 in accordance with traveling of the human-powered vehicle A. The second actuators 20 are operated by electric power from the power storage device 28. In the present embodiment, the second actuators 20 are operated by at least one of electric power that is generated in the electric power generator 26 and electric power that is stored in the power storage device 28 to drive the first actuators 18. The second actuators 20 each include an electric motor 20A. The second actuators 20 each include a transmission (not shown) that changes (decreases or increases) the speed of rotation of the electric motor 20A.

The first actuators 18 each include a pump 18A that uses a liquid as the power transfer medium 16. In the present embodiment, the power transfer medium 16 is hydraulic oil. In the present embodiment, as the electric motor 20A of the second actuator 20 operates, the pump 18A is driven and the hydraulic pressure of the hydraulic oil, which is the power transfer medium 16, is applied to the braking portion 14. Consequently, the braking portion 14, which is a caliper, presses at least one friction member (not shown) against the rotary body F of the human-powered vehicle A to brake the rotary body F.

The electronic controller 24 controls the electric motors 20A so that the corresponding second actuators 20 operate in accordance with inputs to the operating devices 22. In the present embodiment, the electric motors 20A of the second actuators 20 are operated by at least one of electric power that is generated in the electric power generator 26 and electric power that is stored in the power storage device 28, and the pumps 18A of the first actuators 18 are driven.

Second Embodiment

Figure 3:
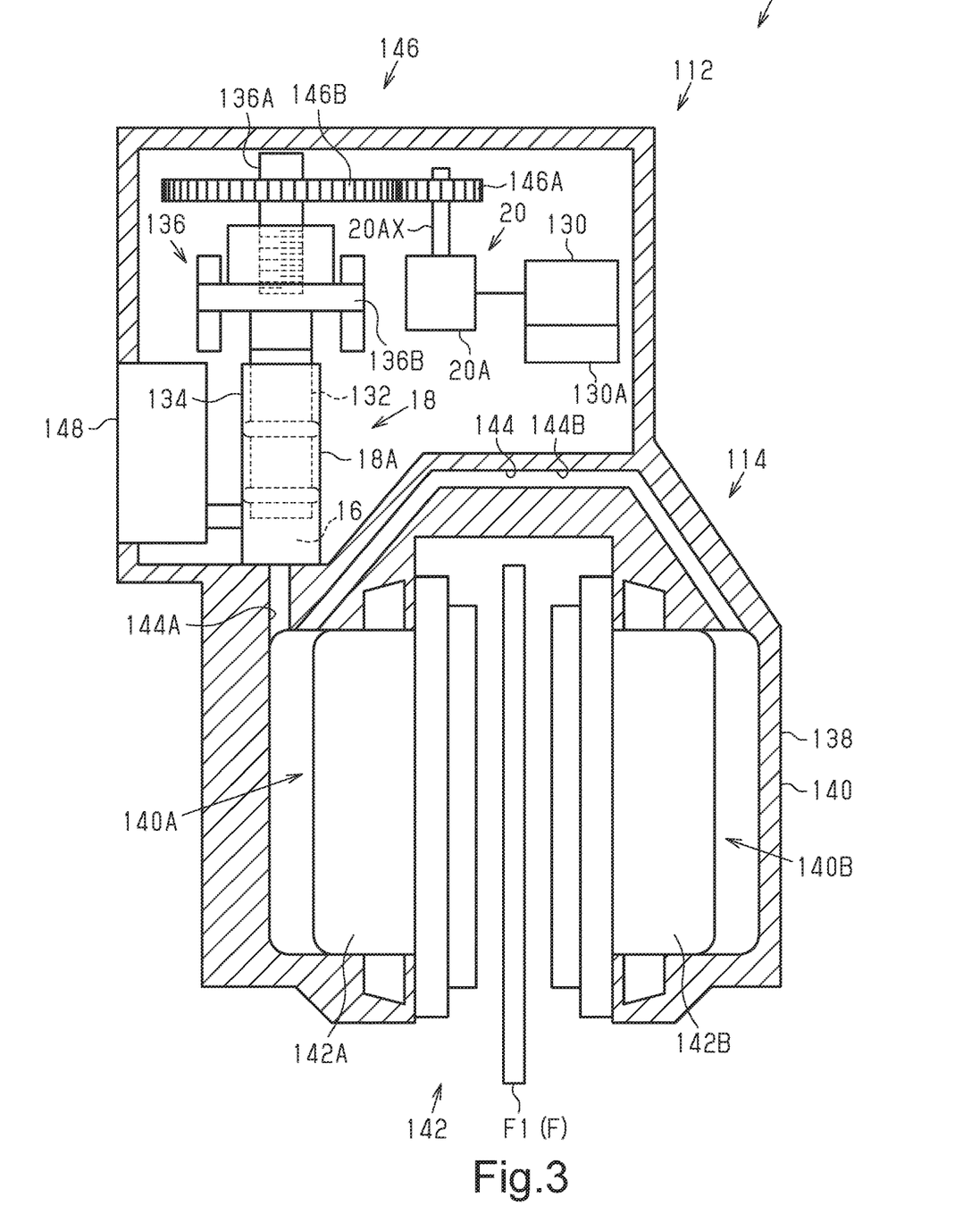
FIG. 3 is a schematic diagram of a second embodiment of a brake system.

A second embodiment of a brake system 100 will now be described with reference to FIG. 3. In the brake system 100 of the second embodiment, the same reference characters are given to those components that are the same as the corresponding components of the first embodiment. Such components will not be described in detail.

The brake system 100 of the second embodiment includes a brake device 112 and an actuator control device 130. The brake device 112 includes a power transfer medium operated braking portion 114, the first actuator 18 and the second actuator 20. The power transfer medium operated brake portion 114 will hereinafter be simply referred to as the brake portion 114. The braking portion 114 is configured to apply a braking force to the rotary body F of the human-powered vehicle A. The first actuator 18 is operatively coupled to the braking portion 114 by a power transfer medium 16. Thus, the first actuator 18 selectively drives the braking portion 114 by the power transfer medium 16. The second actuator 20 is operatively coupled to the first actuator 18 and operated by electric power in accordance with an input to an operating device 22. Thus, the second actuator 20 selectively drives the first actuator 18.

As mentioned above, the second actuator 20 includes the electric motor 20A, while the first actuator 18 includes a pump 18A that uses a fluid as the power transfer medium 16. In the second embodiment, the pump 18A includes a master piston 132 that is driven by the electric motor 20A. Thus, the rotary body F of the human-powered vehicle A is appropriately braked using the power transfer medium 16, which is a fluid such as hydraulic oil.

The pump 18A further includes a cylinder 134 that accommodates the master piston 132 and a piston movement portion 136 that reciprocates the master piston 132 in the cylinder 134. The piston movement portion 136 converts rotational motion of an output shaft 20AX of the electric motor 20A into linear motion. The piston movement portion 136 includes a ball screw 136A and a movable body 136B. The ball screw 136A is located so that the center axis of the ball screw 136A is aligned with the center axis of the master piston 132. The ball screw 136A is inserted into the movable body 136B. One end of the master piston 132 is connected to the movable body 136B. As the output of the electric motor 20A is transmitted to the ball screw 136A, the ball screw 136A rotates in a first direction or a second direction. The movable body 136B is guided by a plurality of guide shafts so as to linearly move in accordance with the rotation of the ball screw 136A. In a case where the ball screw 136A rotates in the first direction, the movable body 136B and the master piston 132 move in a direction approaching the braking portion 114. As a result, the capacity of the cylinder 134 is decreased, and hydraulic pressure of the hydraulic oil is applied to the braking portion 114. In a case where the ball screw 136A rotates in the second direction, the movable body 136B and the master piston 132 move in a direction away from the braking portion 114. As a result, the capacity of the cylinder 134 is increased, and the hydraulic pressure of the hydraulic oil applied to the braking portion 114 is reduced.

The braking portion 114 includes a caliper 138 that clamps the rotary body F. The caliper 138 includes a caliper body 140, a plurality of slave pistons 142 provided at the caliper body 140, and a flow passage 144 provided at the caliper body 140 to apply hydraulic pressure to the plurality of slave pistons 142 in accordance with movement of the master piston 132. Since the slave pistons 142 and the flow passage 144 are provided at the caliper body 140, the configuration of the brake device 112 is simplified. The pump 18A and the electric motor 20A are provided at the caliper body 140. Thus, the configuration of the brake device 112 is simplified.

The slave pistons 142 include a first slave piston 142A and a second slave piston 142B. The first slave piston 142A is partially accommodated in a first chamber 140A provided in the caliper body 140. The second slave piston 142B is partially accommodated in a second chamber 140B provided in the caliper body 140.

The first slave piston 142A and the second slave piston 142B are biased by a return spring (not shown) in directions away from the disc brake rotor F1. The first slave piston 142A is arranged to face one surface of the disc brake rotor F1 via a first brake pad, which is not shown in the drawing. As a predetermined hydraulic pressure is applied from the pump 18A, the first slave piston 142A moves toward the one surface of the disc brake rotor F1 against biasing force of the return spring. The second slave piston 142B is arranged to face the other surface of the disc brake rotor F1 via a second brake pad, which is not shown in the drawings. The second slave piston 142B and the second brake pad are arranged to face the first slave piston 142A and the first brake pad via the disc brake rotor F1. As a predetermined hydraulic pressure is applied from the pump 18A, the second slave piston 142B moves toward the other surface of the disc brake rotor F1 against biasing force of the return spring. That is, the first slave piston 142A and the second slave piston 142B brake the disc brake rotor F1 via the first brake pad and the second brake pad.

The flow passage 144 includes a first flow passage 144A and a second flow passage 144B. The first flow passage 144A connects the cylinder 134 and the first chamber 140A. The second flow passage 144B connects the first chamber 140A and the second chamber 140B.

The brake device 112 further includes a first transmission 146 that is operatively coupled between the electric motor 20A and the master piston 132 to transmit rotation of the electric motor 20A to the master piston 132. In other words, the first transmission 146 is configured to change the speed of rotation of the electric motor 20A and transmits the rotation to the master piston 132. Thus, rotation of the electric motor 20A is changed in speed and is transmitted to the master piston 132. The first transmission 146 is provided at the caliper body 140. The first transmission 146 is a speed reduction mechanism. Thus, rotation of the electric motor 20A is reduced in speed and is transmitted to the master piston 132. The first transmission 146 includes a first gear 146A and a second gear 146B. The first gear 146A is coupled to the output shaft 20AX of the electric motor 20A. The first gear 146A engages with the second gear 146B. The second gear 146B has a larger diameter than the first gear 146A. The second gear 146B is coupled to the ball screw 136A. Rotation of the output shaft 20AX of the electric motor 20A is reduced in speed and is transmitted to the ball screw 136A by the first transmission 146. As a result, the ball screw 136A rotates in the first direction or the second direction.

The brake device 112 further includes a reservoir tank 148 provided at the caliper body 140 to be connected to the pump 18A. The reservoir tank 148 is arranged to absorb changes in the volume of the power transfer medium 16, serving as the hydraulic oil, and changes in the capacity of the passage that are caused by brake pad wear. Thus, the slave pistons 142 are stably located.

The actuator control device 130 is provided at the caliper body 140 to control the first actuator 18. Thus, the configuration of the brake device 112 is simplified. The actuator control device 130 is an electronic controller that includes one or more processors. The actuator control device 130 includes a wireless communication device 130A that is configured to perform wireless communication with an external device. The wireless communication device 130A as used herein includes a receiver, a transceiver, a transmitter-receiver, and contemplates any device or devices, separate or combined, capable of at least receiving wireless communication signals. The wireless communication signals can be radio frequency (RF) signals, ultra-wide band communication signals, or Bluetooth communications or any other type of signal suitable for wireless communications as understood in the bicycle field. Here, the wireless communication device 130A can be a one-way wireless communication device such as a receiver. Thus, the convenience is increased. The external device includes the operating devices 22 (refer to FIG. 1). The actuator control device 130 controls the electric motor 20A so that the second actuator 20 operates in accordance with an input to the operating devices 22. In the present embodiment, the electric motor 20A of the second actuator 20 is operated by at least one of electric power that is generated in the electric power generator 26 and electric power that is stored in the power storage device 28 to drive the pump 18A of the first actuator 18.

Third Embodiment

Figure 4:
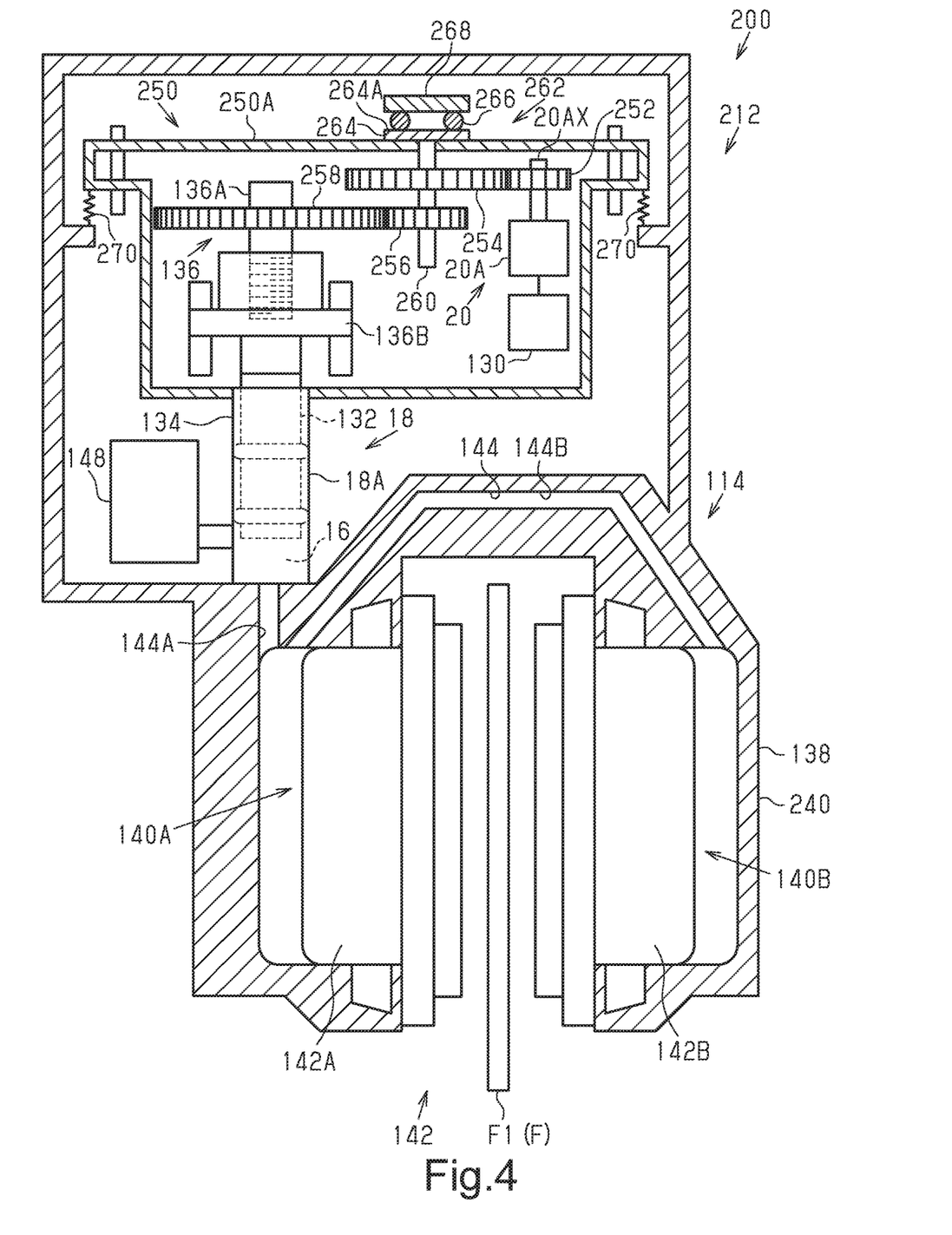
FIG. 4 is a schematic diagram of a third embodiment of a brake system.

A third embodiment of a brake system 200 will now be described with reference to FIG. 4. In the brake system 200 of the third embodiment, the same reference characters are given to those components that are the same as the corresponding components of the second embodiment. Such components will not be described in detail.

The brake system 200 of the third embodiment includes a brake device 212. The brake device 212 further includes a second transmission 250 that changes moving speed of the slave pistons 142. Preferably, the brake device 212 includes a movement mechanism 262 that moves the second transmission 250 and a biasing member 270 that connects the second transmission 250 and a caliper body 240.

The second transmission 250 is operatively coupled between the electric motor 20A and the slave pistons 142 to transmit rotation of the electric motor 20A to the slave pistons 142. In particular, the first transmission 146 is configured to change moving speed of the slave pistons 142 by changing moving speed of the master piston 132. The second transmission 250 includes a housing 250A, a first gear 252, a second gear 254, a third gear 256, a fourth gear 258 and a rotational shaft 260. The housing 250A accommodates the first gear 252, the second gear 254, the third gear 256, the fourth gear 258, and the rotational shaft 260. The first gear 252 is coupled to the output shaft 20AX of the electric motor 20A. The second gear 254 engages with the first gear 252. The second gear 254 has a larger diameter than the first gear 252. The rotational shaft 260 is inserted into the second gear 254. The second gear 254 rotates integrally with the rotational shaft 260. The rotational shaft 260 is inserted into the third gear 256. The third gear 256 has a smaller diameter than the second gear 254. The third gear 256 rotates integrally with the rotational shaft 260. The fourth gear 258 engages with the third gear 256. The fourth gear 258 has a larger diameter than the third gear 256. The fourth gear 258 is coupled to the ball screw 136A. Rotation of the output shaft 20AX of the electric motor 20A is transmitted to the ball screw 136A via the first gear 252, the second gear 254, the third gear 256, and the fourth gear 258.

As the rotation of the electric motor 20A is transmitted, the movement mechanism 262 moves the housing 250A and members accommodated in the housing 250A in a direction approaching the slave pistons 142. The movement mechanism 262 includes a cam member 264, a plurality of balls 266 and a ball seat 268.

The cam member 264 is, for example, discoid. The rotational shaft 260 is inserted into the cam member 264. The cam member 264 rotates integrally with the rotational shaft 260. The cam member 264 is in contact with the housing 250A. The cam member 264 includes a cam surface 264A that is in contact with the plurality of balls 266. The cam surface 264A is, for example, a surface having a depth that changes in the circumferential direction of the cam member 264. In one example, the cam surface 264A is a surface having a depth that shallows in the circumferential direction the cam member 264. The balls 266 are arranged on the ball seat 268 so as to be in contact with the cam surface 264A. The ball seat 268 is fixed to the caliper body 240. The biasing member 270 biases the housing 250A in a direction away from the slave pistons 142.

As rotation of the electric motor 20A is transmitted to the cam member 264 via the first gear 252, the second gear 254, and the rotational shaft 260, the cam member 264 rotates, and the position of the cam surface 264A, which is in contact with the plurality of balls 266, changes. In a case where the deepest part of the cam surface 264A is in contact with the plurality of balls 266, the distance between the cam member 264 and the ball seat 268 is shortest. In a case where the most shallow part of the cam surface 264A is in contact with the plurality of balls 266, the distance between the cam member 264 and the ball seat 268 is longest. As the depth of the cam surface 264A, which is in contact with the plurality of balls 266, is decreased in accordance with rotation of the cam member 264, the cam member 264 moves away from the ball seat 268. Thus, the cam member 264 pushes the housing 250A and the members accommodated in the housing 250A in a direction away from the ball seat 268. As a result, the master piston 132, which is accommodated in the housing 250A, moves in a direction approaching the slave pistons 142, the capacity of the cylinder 134 is decreased, and hydraulic pressure of the hydraulic oil is applied to the braking portion 114. In a case where movement of the slave pistons 142 in accordance with rotation of the cam member 264 is completed, in the same manner as the second embodiment, the master piston 132 is further moved in a direction approaching the slave pistons 142 by the ball screw 136A rotating in the first direction. As a result, the capacity of the cylinder 134 is further decreased, and hydraulic pressure of the hydraulic oil is applied to the braking portion 114. In a case where the electric motor 20A is driven so that the ball screw 136A rotates in the second direction, the cam member 264 rotates so that the depth of the cam surface 264A, which is in contact with the plurality of balls 266, is increased. The housing 250A and the members accommodated in the housing 250A are moved in a direction approaching the ball seat 268 by biasing force of the biasing member 270.

Fourth Embodiment

Figure 5:
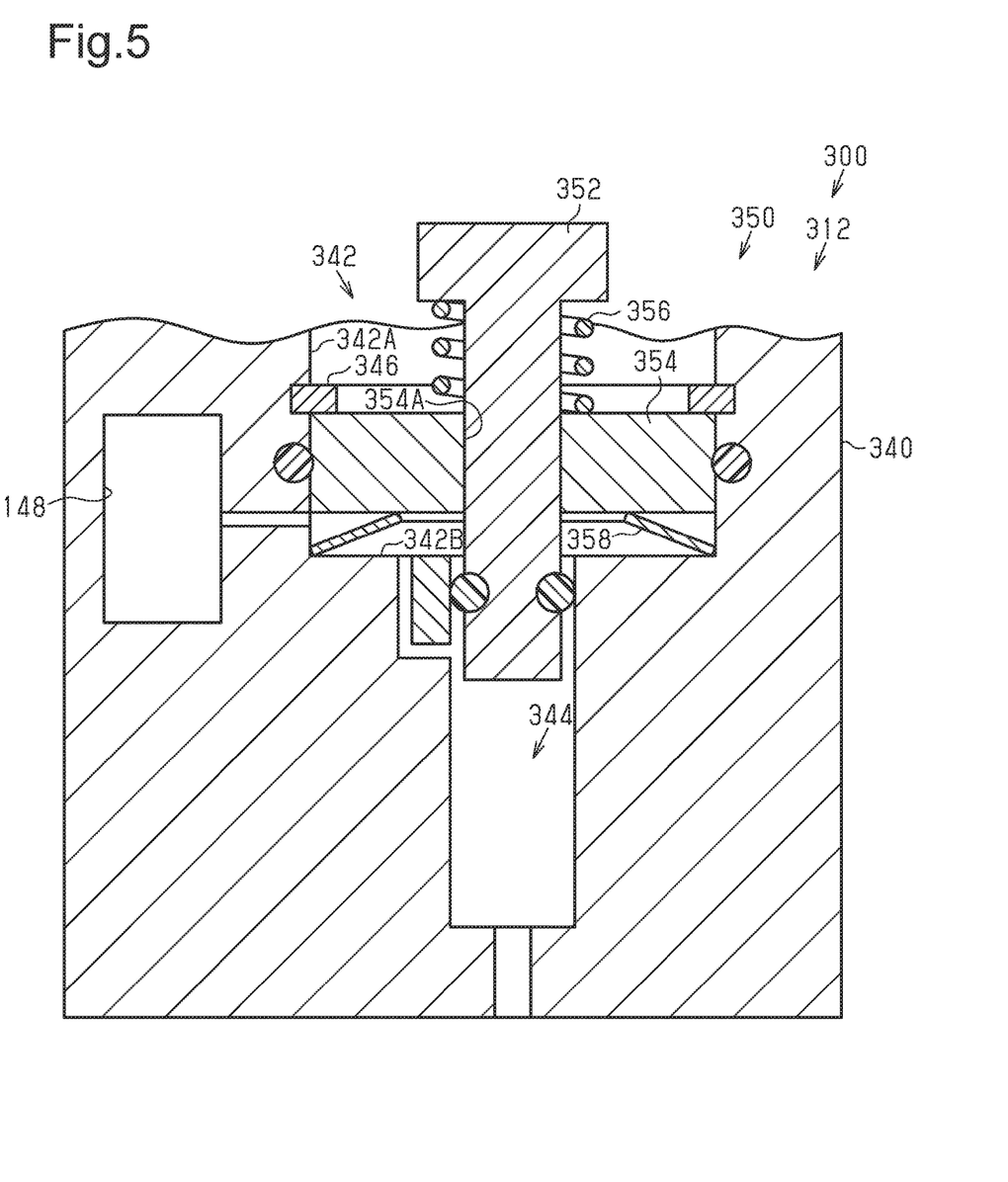
FIG. 5 is a schematic diagram of a fourth embodiment of a brake system.

A brake system 300 can include a brake device 312 that includes a second transmission 350, which is shown in FIG. 5, in place of the second transmission 250 of the third embodiment. The second transmission 350 changes moving speed of the slave pistons 142 by changing a fluid feeding amount per unit time towards the slave pistons 142. The second transmission 350 includes a master piston 352, a sub-piston 354, a first biasing member 356, and a second biasing member 358. The master piston 352 of the fourth embodiment is driven, for example, by the electric motor 20A via the first transmission 146 and the piston movement portion 136, which are described in the second embodiment. Thus, the second transmission 350 is operatively coupled between the electric motor 20A and the master piston 352 to change the moving speed of the slave piston 142 by changing a moving speed of the master piston 352.

The master piston 352 is inserted into a hole 354A provided in the sub-piston 354. The master piston 352 is provided to be movable with respect to the sub-piston 354. The first biasing member 356 biases the master piston 352 away from the sub-piston 354. The first biasing member 356 is, for example, a coil spring. The second biasing member 358 biases the sub-piston 354 away from a caliper body 340. The second biasing member 358 is, for example, a disc spring. Biasing force of the second biasing member 358 is less than biasing force of the first biasing member 356.

The caliper body 340 includes a first groove 342, a second groove 344, and a stopper 346. The first groove 342 has a larger capacity than the second groove 344. The second groove 344 is connected to the first groove 342. The stopper 346 is provided in a side wall 342A of the first groove 342. The stopper 346 restricts movement of the sub-piston 354 in a direction away from the second groove 344. The sub-piston 354 moves between the stopper 346 and a bottom 342B of the first groove 342.

As the output of the electric motor 20A (refer to FIG. 3) is transmitted to the ball screw 136A (refer to FIG. 3), the ball screw 136A rotates in the first direction or the second direction. In a case where the ball screw 136A rotates in the first direction, the movable body 136B (refer to FIG. 3) and the master piston 352 move in a direction approaching the braking portion 114 (refer to FIG. 3). In a case where the master piston 352 moves in the direction approaching the braking portion 114, the sub-piston 354, which is connected to the master piston 352 via the first biasing member 356, moves in the direction approaching the braking portion 114 against biasing force of the second biasing member 358. As a result, the capacity of the first groove 342 is decreased, and hydraulic pressure of the hydraulic oil is applied to the braking portion 114. In a case where the sub-piston 354 is in contact with the bottom 342B of the first groove 342, the master piston 352 further moves in the direction approaching the braking portion 114 against biasing force of the first biasing member 356. As a result, the capacity of the second groove 344 is decreased, and the hydraulic pressure of the hydraulic oil is further applied to the braking portion 114.

Modifications

The description related to the above embodiment exemplifies, without any intention to limit, applicable forms of a brake device and a brake system according to the present disclosure. The brake device and the brake system according to the present disclosure are applicable to, for example, modifications of the above embodiment and combinations of at least two of the modifications that do not contradict each other. In the following modifications, the same reference characters are given to those components that are the same as the corresponding components of the embodiment. Such components will not be described in detail.

The configuration of the power storage device 28 can be changed in any manner. In a first example, the power storage device 28 includes a capacitor (not shown). In a second example, the power storage device 28 is configured not to be charged by the external power supply EP.

The configuration of the electric power generator 26 can be changed in any manner. In a first example, the electric power generator 26 supplies electric power to only the power storage device 28. In this example, the entire electric power generated in the electric power generator 26 is stored in the power storage device 28, and the second actuators 20 are operated by only the electric power stored in the power storage device 28. In a second example, the electric power generator 26 supplies electric power to only the various electric components included in the brake system 10. In this example, the power storage device 28 can be omitted from the brake system 10.

The configuration of the brake devices 12, 112, 212, and 312 can be changed in any manner. As shown in FIG. 2, the first actuator 18 can be a cable control mechanism 18B that uses a cable (not shown) as the power transfer medium 16. One example of the cable control mechanism 18B is a rack-and-pinion mechanism. As the second actuator 20 operates, the cable control mechanism 18B of the first actuator 18 is driven, and as the power transfer medium 16 moves with respect to the cable control mechanism 18B, the braking portion 14 is driven. As a result, the rotary body F of the human-powered vehicle A is braked by the braking portion 14. For example, the brake device 12 is configured to drive the braking portion 14 by driving the cable control mechanism 18B so that the power transfer medium 16 is pulled toward the cable control mechanism 18B with respect to the braking portion 14. In this case, a one-way clutch can be provided to the rack-and-pinion mechanism and also an elastic member (not shown) such as a spring can be provided to the braking portion 14 so that after the operating device 22 is operated, the cable, which is the power transfer medium 16, is configured to move back toward the braking portion 14.

The configuration of the brake systems 10, 100, 200, and 300 can be changed in any manner. In one example, at least one of the electric power generator 26 and the power storage device 28 is omitted from the brake system 10. In this example, the second actuators 20 drive the first actuators 18 with electric power supplied from the battery BT.

The configuration of the human-powered vehicle A can be changed in any manner. In one example, the electric assist unit E is omitted from the human-powered vehicle A. In this example, the assist regeneration mechanism 26C is omitted from the electric power generator 26.

The type of the human-powered vehicle A can be changed in any manner. In a first example, the type of the human-powered vehicle A is a road bike, a mountain bike, a trekking bike, or a cross bike. In a second example, the type of the human-powered vehicle A is a kick scooter.

What is claimed is:

1. A brake device for applying a braking force to a rotary body of a human-powered vehicle, the brake device comprising:
   a power transfer medium operated braking portion, the braking portion including a caliper configured to clamp the rotary body;
   a first actuator operatively coupled to the power transfer medium operated braking portion by a power transfer medium, the first actuator including a pump using a fluid as the power transfer medium; and
   a second actuator operatively coupled to the first actuator and operated by electric power in accordance with an input to an operating device, the second actuator including an electric motor,
   the pump including a master piston configured to be driven by the electric motor,
   the caliper including a caliper body, a plurality of slave pistons provided at the caliper body, and a flow passage provided at the caliper body to apply hydraulic pressure to the plurality of slave pistons in accordance with movement of the master piston,
   an axis of a motor output shaft of the electric motor and a longitudinal axis of the master piston are offset and substantially parallel, and
   each of movement directions of each of the plurality of slave pistons is configured to be different from each of movement directions of the master piston.

2. The brake device according to claim 1, wherein the second actuator is operated by the electric power generated in an electric power generator in accordance with traveling of the human-powered vehicle.

3. The brake device according to claim 1, wherein the pump and the electric motor are provided at the caliper body.

4. The brake device according to claim 3, further comprising
   a first transmission operatively coupled between the electric motor and the master piston to transmit rotation of the electric motor to the master piston, the first transmission being provided at the caliper body.

5. The brake device according to claim 4, wherein the first transmission is a speed reduction mechanism.

6. The brake device according to claim 1, further comprising
   a reservoir tank provided at the caliper body and fluidly connected to the pump.

7. The brake device according to claim 1, further comprising
   a second transmission operatively coupled between the electric motor and the slave pistons to change a moving speed of the slave pistons.

8. The brake device according to claim 7, wherein the second transmission is operatively coupled between the electric motor and the master piston to change the moving speed of the slave pistons by changing a moving speed of the master piston.

9. The brake device according to claim 7, wherein the second transmission is operatively coupled between the electric motor and the master piston to change the moving speed of the slave pistons by changing a fluid feeding amount of the fluid per unit time towards the slave pistons.

10. A brake system comprising the brake device according to claim 1, and further comprising
    an electric power generator that generates electricity in accordance with traveling of the human-powered vehicle.

11. The brake system according to claim 10, wherein the electric power generator includes at least one of a hub dynamo, a block dynamo, an assist regeneration mechanism, and a vibration electricity generating element.

12. The brake system according to claim 10, further comprising
    a power storage device electrically connected to the electric power generator.

13. The brake system according to claim 12, wherein the power storage device includes a rechargeable battery.

14. The brake system according to claim 12, wherein the power storage device is further configured to be recharged by an external power supply other than the electric power generator.

15. The brake system according to claim 12, wherein the second actuator is operated by electric power from the power storage device.

16. The brake system according to claim 10, further comprising
    the operating device.

17. The brake system according to claim 10, further comprising
    an electronic controller operatively coupled to the second actuator.

18. A brake system comprising the brake device according to claim 1, and further comprising
    an actuator control device provided at the caliper body to control the first actuator.

19. The brake system according to claim 18, wherein the actuator control device includes a wireless communication device that is configured to perform wireless communication with an external device.

20. The brake system according to claim 19, wherein the external device includes the operating device.

* * * * *